(12) United States Patent
Zhao et al.

(10) Patent No.: US 11,038,947 B2
(45) Date of Patent: Jun. 15, 2021

(54) AUTOMATED CONSTRAINT-BASED DEPLOYMENT OF MICROSERVICES TO CLOUD-BASED SERVER SETS

(71) Applicant: Microsoft Technology Licensing, LLC, Redmond, WA (US)

(72) Inventors: Yue Zhao, Redmond, WA (US); Siddharth Verma, Seattle, WA (US); Huaming Huang, Sammamish, WA (US); Ash Beitz, Redmond, WA (US); Arbab Amjad, Bothell, WA (US); Muhammad Usman Sharif, Bothell, WA (US); Abhishek Singh, Redmond, WA (US); Avnish Kumar Chhabra, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 336 days.

(21) Appl. No.: 15/494,363

(22) Filed: Apr. 21, 2017

(65) Prior Publication Data
US 2018/0309630 A1 Oct. 25, 2018

(51) Int. Cl.
*G06F 9/445* (2018.01)
*G06F 9/44* (2018.01)
(Continued)

(52) U.S. Cl.
CPC .......... *H04L 67/10* (2013.01); *H04L 41/0893* (2013.01); *H04L 41/145* (2013.01); *H04L 67/18* (2013.01)

(58) Field of Classification Search
None
See application file for complete search history.

(56) References Cited

U.S. PATENT DOCUMENTS

2015/0309780 A1* 10/2015 Ruehl ................. H04L 67/1095
717/176
2015/0378703 A1* 12/2015 Govindaraju ............ G06F 8/60
717/174
(Continued)

FOREIGN PATENT DOCUMENTS

CN 105607903 A 5/2016

OTHER PUBLICATIONS

"XebiaLabs for Microservices", https://xebialabs.com/solutions/microservices/, Retrieved on: Jan. 16, 2016, 6 pages.
(Continued)

*Primary Examiner* — Nicholas R Taylor
*Assistant Examiner* — Ho T Shiu
(74) *Attorney, Agent, or Firm* — Fiala & Weaver P.L.L.C.

(57) ABSTRACT

Methods, systems, apparatuses, and computer program products are provided that enable the automated deployment of microservices to a network-accessible server set. The automated deployment may be based on constraint(s) that are specified by a declarative deployment model that is associated with the microservice to be deployed. For example, a centralized deployment orchestrator may receive microservice(s) and their associated declarative deployment model(s). The deployment orchestrator analyzes the declarative deployment model(s) and determines which microservice(s) are to be deployed based on the constraint(s) specified by the declarative deployment model(s). The foregoing techniques advantageously determine when to deploy microservice(s), while also minimizing human intervention typically required to deploy microservice(s). Moreover, by controlling when certain microservice(s) are deployed and/or which microservice(s) are deployed, deployed microservice(s) that function incorrectly and/or cause at least a
(Continued)

portion of the network-accessible computing environment to malfunction can be easily identified.

20 Claims, 6 Drawing Sheets

(51) Int. Cl.
  *H04L 29/08* (2006.01)
  *H04L 12/24* (2006.01)

(56) References Cited

U.S. PATENT DOCUMENTS

| | | | |
|---|---|---|---|
| 2016/0124742 A1 | 5/2016 | Rangasamy et al. | |
| 2016/0321051 A1 | 11/2016 | Austel et al. | |
| 2016/0378449 A1* | 12/2016 | Khazanchi | G06F 8/71 717/120 |
| 2017/0041406 A1* | 2/2017 | Lawson | H04L 65/403 |
| 2017/0046146 A1* | 2/2017 | Jamjoom | G06F 8/62 |

OTHER PUBLICATIONS

Shriram Rajagopalan, "Amalgam8: Simplifying microservice orchestration and integration", https://developer.ibm.com/open/2016/06/30/amalgam8-simplifying-microservice-orchestration-integration/, Published on: Jun. 30, 2016, 6 pages.

Oberhauser, Roy, "Microflows: Lightweight Automated Planning and Enactment of Workflows Comprising Semantically-Annotated Microservices", In Proceedings of the Sixth International Symposium on Business Modeling and Software Design, Jun. 20, 2016, pp. 134-143.

Russinovich, Mark, "Microservices: An application revolution powered by the cloud", https://azure.microsoft.com/nl-nl/blog/microservices-an-application-revolution-powered-by-the-cloud/, Published on: Mar. 17, 2016, 11 pages.

Ceresani, Necco, "Developing a Microservices Pipeline", https://blog.xebialabs.com/2016/02/29/supporting-a-microservices-architecture/, Published on: Feb. 29, 2016, 3 pages.

Visti, et al., "MiCADO—Towards a microservice-based cloud application level dynamic orchestrator", In Proceedings of 8th International Workshop on Science Gateways, Jun. 8, 2016, pp. 1-9.

Curlett, Conor, "Take the API approach to microservices and lessons learned from SOA", http://blogs.mulesoft.com/dev/microservices-dev/api-approach-to-microservices-lessons-learned-from-soa/, Published on: Oct. 17, 2016, 12 pages.

Torre, et al., "Microsoft Azure—Azure Service Fabric and the Microservices Architecture", https://msdn.microsoft.com/en-us/magazine/mt595752.aspx, Published on: Dec. 2015, 24 pages.

Hickey, Andrew, "Application Delivery Service Challenges in Microservices-Based Applications", https://www.a10networks.com/blog/application-delivery-service-challenges-microservices-based-applications, Published on: Mar. 21, 2016, 23 pages.

Moga, et al., "OS-level virtualization for industrial automation systems: are we there yet?", In Proceedings of the 31st Annual ACM Symposium on Applied Computing, Apr. 4, 2016, pp. 1838-1843.

* cited by examiner

AUTOMATED CONSTRAINT-BASED DEPLOYMENT OF MICROSERVICES TO CLOUD-BASED SERVER SETS

BACKGROUND

Microservices are processes that communicate with each other over a network, each tending to be independently developed and deployed, and each providing respective capabilities to the microservices network that are relatively confined in scope. The use of microservices has been trending upwards and is being adopted by many large scale distributed systems. The deployment of microservices provides agility and safety by reducing the risk for any individual deployment. If microservices are all completely disconnected and truly independent, then the rollout of microservices can be completely separated. However, in reality, there are scenarios in which microservices have constraints on each other.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable the automated deployment of microservices to a network-accessible server set (e.g., a set of computers distributed across datacenters accessible in "the cloud"). The automated deployment may be based on one or more constraints that are specified by a declarative deployment model that is associated with the microservice to be deployed. For example, a centralized deployment orchestrator (which is coupled to a set of microservice development systems and the network-accessible server set) may receive one or more microservices and their associated declarative deployment model(s). The deployment orchestrator analyzes the declarative deployment model(s) and determines which microservice(s) are to be deployed based on the constraint(s) specified by the declarative deployment model(s).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
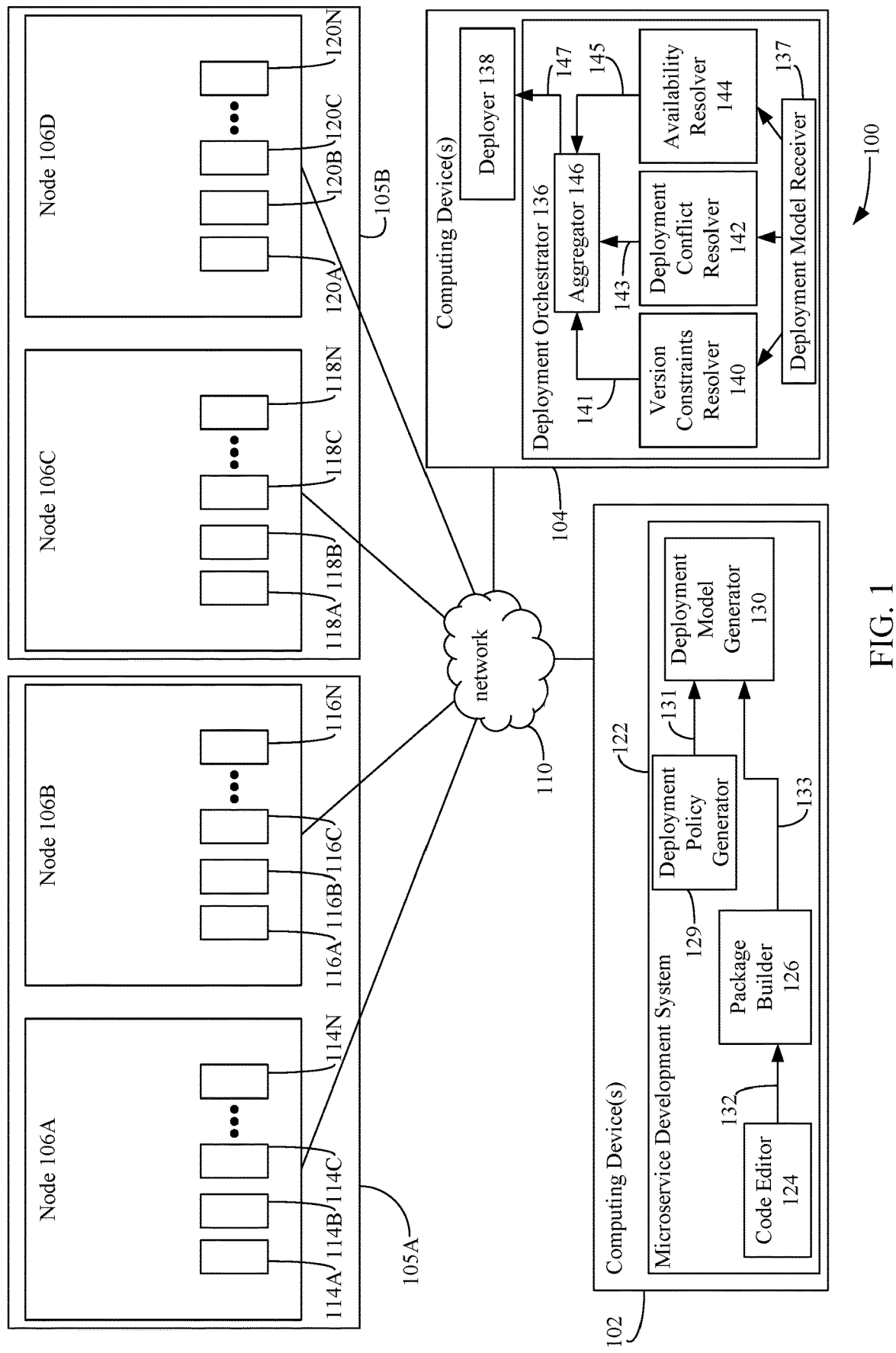
FIG. 1 shows a block diagram of a system for automatically deploying one or more microservices to a network-accessible server set, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Exemplary Embodiments

Embodiments described herein enable the automated deployment of microservices to a network-accessible server set (e.g., a set of computers distributed across datacenters accessible in "the cloud"). The automated deployment may be based on one or more constraints that are specified by a declarative deployment model that is associated with the microservice to be deployed. For example, a centralized deployment orchestrator (which is coupled to a set of microservice development systems and the network-accessible server set) may receive one or more microservices and their associated declarative deployment model(s). The deployment orchestrator analyzes the declarative deployment model(s) and determines which microservice(s) are to be deployed based on the constraint(s) specified by the declarative deployment model(s).

The foregoing techniques advantageously determine when to deploy microservice(s), while also minimizing human intervention typically required to the deploy microservice(s). Moreover, by controlling when certain microservice(s) are deployed and/or which microservice(s) are deployed, any deployed microservice(s) that function incorrectly and/or cause at least a portion of the network-accessible computing environment to malfunction can be easily identified. Once a problematic microservice is identified, deployment of that microservice to other portions of the network-accessible computing environment will be halted, thereby reducing the impact of the problematic microservice. Furthermore, in the event that such a malfunction occurs, other microservice(s) may be deployed to other portions of the network-accessible server set, thereby enabling users to continue using such microservice(s) without interruption.

The embodiments and techniques disclosed herein also provide for arrangements of components for automatically deploying microservice(s). That is, the embodiments and techniques disclosed herein relate to one or more non-conventional and non-generic arrangements of elements in the microservice deployment process. For instance, the deployment orchestrator may be centralized with respect to the development system(s) for developing microservice(s) and the network-accessible server set. The development system(s) may be located in different locations worldwide. Thus, embodiments and techniques described herein advantageously enable the deployment orchestrator to determine which globally-developed microservice(s) are to be deployed, thereby providing a worldwide coordination of microservice deployment across different development teams.

The embodiments and techniques disclosed herein also provide for improving the technological process of microservice deployment through the use of specified constraints that govern deployment of microservice(s), rather than human-based implementations, which require manual interaction between developers/development teams located in different regions around the world to coordinate the deployment of the microservices being developed thereby. The described embodiments and techniques utilize specific declarative deployment models that are analyzed to determine whether microservice(s) are to be automatically deployed, that previously could not be automated in such a manner. That is, human-based approaches do not involve generating an declarative deployment model upon which microservice(s) are automatically deployed.

For instance, FIG. 1 shows a block diagram of a system 100 for automatically deploying one or more microservices to a network-accessible server set, according to an example embodiment. As shown in FIG. 1, system 100 includes one or more computing devices 102, one or more computing devices 104, a first cluster 105A of nodes 106A and 106B, and a second cluster 105B of nodes 106C and 106D. Computing device(s) 102, computing device(s) 104, and each of clusters 105A and 105B may be communicatively connected via a network 110. Network 110 may comprise one or more networks such as local area networks (LANs), wide area networks (WANs), enterprise networks, the Internet, etc., and may include one or more of wired and/or wireless portions.

Clusters 105A and 105B may form a network-accessible server set. For example, each of nodes 106A, 106B, 106C, and 106D may comprise a group or collection of one or more servers (e.g., computing devices) that are each hosted on a network such as the Internet (e.g., in a "cloud-based" embodiment) to store, manage, and process data. In an embodiment, nodes 106A, 106B, 106C, and/or 106D may be co-located (e.g., housed in one or more nearby buildings with associated components such as backup power supplies, redundant data communications, environmental controls, etc.) to form a datacenter, or may be arranged in other manners. Accordingly, in an embodiment, nodes 106A-106D may each be a datacenter in a distributed collection of datacenters. It is noted that while FIG. 1 shows two clusters 105A and 105B each having two nodes, system 100 may include any number of clusters, and each cluster may include any number of nodes.

In accordance with an embodiment, nodes (e.g., nodes 106A-106D) and/or clusters (e.g., clusters 105A-105B) located in a first geographic region (e.g., North Central US) may be paired with a second plurality of nodes and/or clusters located in a second geographic region (e.g., South Central US). The first plurality and the second plurality may be collectively referred to as a region pair. The network-accessible server set may comprise any number of region pairs, where each region pair covers a different portion of the world. Moreover, each region of a region pair may include one or more availability zones. Each availability zone may include one or more clusters (e.g., clusters 105A and/or 105B) located within that region.

Each of node 106A, node 106B, node 106C, and node 106D may be configured to host and execute one or more microservice applications ("microservice(s)"). Microservices are small, independently versioned and scalable, modular customer-focused services (computer programs/applications) that communicate with each other over standard protocols (e.g., HTTP, SOAP, etc.) with well-defined interfaces (e.g., application programming interfaces (APIs)). Each microservice may implement a set of focused and distinct features or functions. Microservices may be written in any programming language and may use any framework. As shown in FIG. 1, node 106A may be configured to host and execute microservices 114A-114N, node 106B may be configured to host and execute microservices 116A-116N, node 106C may be configured to host and execute microservices 118A-118N, and node 106D may be configured to host and execute microservices 120A-120N, where N is any integer greater than 1. Each of nodes 106A-106D may be configured to co-host and execute any number of microservices and/or instances of the same microservices.

Computing device(s) 102 may include a microservice development system 122, which may be used to develop microservices to be maintained and/or executed by nodes 106A, 106B, 106C, and/or 106D. For example, microservice development system 122 may include a source code editor 124, a package builder 126, a deployment policy generator 129, and/or a deployment model generator 130. Source code editor 124, package builder 126, deployment policy generator 129, and deployment model generator 130 may be included in a same computing device, or one or more of source code editor 124, package builder 126, deployment policy generator 129, and deployment model generator 130 may be implemented in or more computing devices separate from those of others of source code editor 124, package builder 126, deployment policy generator 129, and deployment model generator 130. Any number of computing device(s) 102 may be present that are used by corresponding developers to develop microservices.

Computing device(s) 102 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server.

A developer may interact with source code editor 124 to enter and modify program code when generating source code for a microservice. For instance, the developer may add, modify, or delete program code text using source code editor 124 such as by typing, by voice input, by selecting suggested code blocks, etc. When complete, or at other intervals, the user may be enabled to save the program code by interacting with a "save" button or other user interface element. Source code editor 124 may be a browser based editor, a code editor integrated in a desktop or mobile application, or any other type of code editor.

For instance, as shown in FIG. 1, a developer may interact with source code editor 124 to generate source code 132. Source code 132 is a collection of computer instructions (possibly with comments) written using a human-readable computer programming language. Examples of suitable human-readable computer programming languages include C, C++, Java, etc. Source code 132 may be received in one or more files or other form. For instance, source code 132 may be received as one or more ".c" files (when the C programming language is used), as one or more ".cpp" files (when the C++ programming language is used), etc. Package builder 126 may be configured to receive and compile, package, version, and/or sign source code 132 to generate a microservice package 133.

A developer may interact with deployment policy generator 129 to generate a declarative deployment policy 131 for the microservice being developed and to be deployed to nodes 106A, 106B, 106C, and/or 106D for execution thereby. Declarative deployment policy 131 may be configured to specify one or more constraints with respect to one or more other microservices, other versions of the microservice to be deployed, and/or availability constraints. The constraint(s) specified by declarative deployment policy 131 may be user-specified and/or automatically determined. For example, a developer may add, modify, or delete constraints using deployment policy generator 129, such as by typing, by interacting with a graphical user interface (GUI), by voice input, etc. Declarative deployment policy 131 may be saved as a JavaScript Object Notation (JSON) file, a text (.txt) file, or any other file into which a developer may enter human-readable text to specify constraints (the file may be stored in a human-readable or machine-readable form). Declarative deployment policy 131 is provided to deployment model generator 130, and deployment model generator 130 generates a declarative deployment model based on microservice package 133 and declarative deployment policy 131. Alternatively, a developer may provide one or more generated binaries that represent a particular deployment policy to deployment model generator 130, and deployment model generator 130 may generate a deployment model based on microservice package 133 and the binar(ies). The deployment model generated is declarative in that relations between microservices are stated in the form of constraints in a non-imperative manner, rather than specifying a step or sequence of steps to execute. Declarative deployment policy 131 may specify whether the deployment of the microservice being developed is dependent on whether a specified version of that microservice and/or other microservice(s) (i.e., version constraints) have already been deployed. In particular, declarative deployment policy 131 may specify that the microservice being developed (e.g., "Microservice A") can only deployed after version x.z of Microservice A has already been deployed and/or a version x.y of another microservice (e.g., "Microservice B") is deployed.

Declarative deployment policy 131 may also specify whether the deployment of Microservice A conflicts with the deployment of Microservice B (i.e., deployment conflicts). For example, Microservice A and Microservice B may be unable to be simultaneously deployed due to a physical limitation and/or organization of nodes 106A, 106B, 106C, and/or 106D and/or server(s) 112A, 112B, 112C, and 112D. In such an example, in the event that either Microservice A or Microservice B operates incorrectly and causes an issue within the system, it may become difficult to determine which of Microservice A or Microservice B caused the issue. Thus, declarative deployment policy 131 may be generated such that it specifies that a conflict exists between Microservice A or Microservice B, thereby enabling Microservice A to be deployed before Microservice B, or vice versa.

Declarative deployment policy 131 may also specify one or more regional (or availability) constraint(s) for Microservice A. In particular, declarative deployment policy 131 may specify one or more geographical regions (e.g., a region of a region pair and/or an availability zone within that region) in which Microservice A is to be deployed. By deploying a microservice to an availability zone within a particular region and/or a particular region of a region pair (rather than the entire region or region pair), any issues caused by the deployment (e.g., due to a malfunctioning microservice) will be contained to that availability zone and/or particular region.

Further types of constraints may be included in declarative deployment policy 131, including those that would be apparent to persons skilled in the relevant art(s) based on the teachings herein.

Deployment model generator 130 may generate a declarative deployment model reflective of the constraints specified by declarative deployment policy 131. After the developer is finished developing the microservices(s) and the corresponding declarative deployment model(s) have been generated, the microservice(s) and the declarative deployment model(s) are provided to computer device(s) 104 via network 110.

Computing device(s) 104 may be any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. In accordance with an embodiment, computing device(s) 104 may be a cluster of computing nodes running in an active-active configuration (i.e., each of the computing nodes in the cluster are actively running the same kind of service (e.g., a deployment orchestrator 136)).

As shown in FIG. 1, computing device(s) 104 includes deployment orchestrator 136 and deployer 138. Deployment orchestrator 136 and deployer 138 may be included in a same computing device, or each of deployment orchestrator 136 and deployer 138 may be included in different computing devices. Deployment orchestrator 136 may be configured to orchestrate the deployment of microservices globally by determining which microservice is to be deployed and when that microservice is to be deployed to the network-accessible server set. Deployer 138 may be a deployment engine (e.g., one or more services) that performs the deployment to the network-accessible server set. Examples of deployer 138 include, but are not limited to, Kubernetes, Chef, Ansible, and the like.

Deployment orchestrator 136 is configured to automatically deploy microservices in accordance with the constraints specified by the corresponding declarative deployment model to nodes 106A, 106B, 106C, and/or 106D via network 110. For example, deployment orchestrator 136 may analyze (e.g., parse) one or more declarative deployment models to determine the constraints specified thereby and determine which one or more microservices are to be deployed.

As shown in FIG. 1, deployment orchestrator 136 may include a deployment model receiver 137, version constraints resolver 140, a deployment conflict resolver 142, an availability resolver 144, and an aggregator 146. Deployment model receiver 137 may be configured to receive one or more declarative deployment models from computing device(s) 102 and provide the declarative deployment model(s) to version constraints resolver 140, deployment conflict resolver 142, and/or availability resolver 144. In accordance with an embodiment, deployment model receiver 137 includes a communications receiver or transceiver and may be optionally configured to perform additional functions, such as, but not limited to, authenticating, processing, verifying and/or formatting declarative deployment model(s), etc.

Version constraints resolver 140 may evaluate whether any version constraints are specified by the declarative deployment model and, if so, determines whether the constraints have been satisfied. The version constraints may comprise a target constraint, an upgrade compatibility constraint, and/or a dependency constraint. The target constraint specifies the minimum version of the microservice that is required to be executing on a particular cluster (e.g., clusters 105A and/or 105B) and/or node (106A, 106B, 106C, and/or 106C). This ensures that cluster(s) and/or node(s) of the network-accessible server set are running at least the target version of the microservice (e.g., the version of the microservice must be at least version 2.0). The upgrade compatibility constraint specifies whether a certain version of a deployed microservice is upgradeable to the version of the microservice to be deployed. The dependency constraint specifies whether the version of the microservice to be deployed is compatible with a version of one or more other deployed microservices.

In the event that version constraints resolver 140 determines that a declarative deployment model specifies that a particular microservice to be deployed is dependent on the deployment of a specified version of that microservice and/or other microservice(s), version constraints resolver 140 may determine that the version constraint has been satisfied after the specified version of that microservice and/or other microservice(s) have been deployed. In accordance with an embodiment, to determine whether that the microservice and/or other microservice(s) have been deployed, version constraints resolver 140 determines whether that microservice and/or other microservice(s) are executing on nodes 106A, 106B, 106C, and/or 106D and queries those microservice(s) to determine the version number thereof. In accordance with another embodiment, version constraints resolver 140 may infer the version number of the deployed microservice(s) by analyzing the file and/or package names of those microservice(s).

In either case, if the determined version(s) of the deployed microservice and/or other deployed microservice(s) satisfy the version constraint(s) specified by the declarative deployment model, version constraints resolver 140 may provide an indicator 141 to aggregator 146 that indicates that the version constraint(s) have been satisfied. Version constraints resolver 140 may also provide indicator 141 in the event that no version constraint(s) have been specified by the declarative deployment model. In the event that the determined versions(s) do not satisfy the version constraint(s), version constraints resolver 140 does not provide indicator 141, and the microservice is not deployed.

Deployment conflict resolver 142 may evaluate whether any deployment conflict constraints are specified by the declarative deployment model and, if so, determines whether the constraints have been satisfied. For example, in the event that deployment conflict resolver 142 determines that a declarative deployment model specifies that a particular microservice conflicts with the deployment of other microservice(s), deployment conflict resolver 142 may determine whether the other microservice(s) are being deployed. In the event that deployment conflict resolver 142 determines that the other microservice(s) are being deployed, deployment conflict resolver 142 may determine that the constraints have not been satisfied, and therefore, deployment of the microservice is not started. In the event that deployment conflict resolver 142 determines that the other microservice(s) are not being deployed, deployment conflict resolver 142 may determine that the constraints have been satisfied and may provide an indicator 143 to aggregator 146 that indicates that the deployment conflict constraints have been satisfied. Deployment conflict resolver 142 may also provide indicator 143 in the event that no deployment conflict constraint(s) have been specified by the declarative deployment model.

Availability resolver 144 may evaluate whether any availability constraints are specified by the declarative deployment model and, if so, determine whether the constraints have been satisfied. For example, in the event that availability resolver 144 determines that a declarative deployment model specifies that a microservice is to be deployed to one or more specified geographical regions (e.g., an availability zone within a region and/or a particular region of a region pair), availability resolver 144 may provide an indicator 145 to aggregator 146 that identifies the cluster (e.g., cluster 105A and/or 105B) and/or node (e.g., node

106A, 106B, 106C, and/or 106D) corresponding to the specified geographical region. For example, if the declarative deployment model specifies that the microservice is to be deployed in Availability Zone 1 of the North Central US region, indicator 145 may indicate the cluster(s) (e.g., cluster 105A and/or cluster 105B) corresponding to Availability Zone 1 of the North Central US region.

Availability resolver 144 may also determine which geographical region(s) to deploy the microservice. For example, availability resolver 144 may determine whether a region of a region pair and/or an availability zone within that region already has a version of the microservice deployed. In the event that availability resolver 144 determines that a particular region and/or an availability zone within that region has the microservice deployed (or that the microservice is being deployed), availability resolver 144 may provide an indicator 145 to aggregator 146 that indicates that the microservice is to be deployed to that region and/or zone, thereby ensuring that the deployment of that microservice is localized to that region and/or zone. In the event that availability resolver 144 determines that no region and/or availability zone has the microservice deployed, then availability resolver 144 may select the region of a region pair having the most computing resources (e.g., clusters (e.g., cluster 105A or cluster 105B)). In the event that the regions have the same number of computing resources, then availability resolver 144 may randomly-select the region. After determining which region of the region pair to deploy the microservice, availability resolver 144 may determine which availability zone of the determined region to deploy the microservice using the same selection scheme used to determine the region. In particular, availability resolver 144 may select an availability zone of the determined region having the most computing resources. In the event that the each availability zone of the determined region has the same number of computing resources, then availability resolver 144 may randomly-select the availability zone. After determining the region and/or availability zone to which the microservice is to be deployed, availability resolver 144 may provide an indicator 145 that indicates the determined region and/or zone to aggregator 146.

Aggregator 146 may cause a microservice to be deployed by deployer 138 upon each of version constraints resolver 140, deployment conflict resolver 142, and availability resolver 144 determining that the respective constraint(s) being analyzed have been satisfied. In particular, upon receiving each of indicators 141, 143, and 145, aggregator 146 may provide a deployment request 147 to deployer 138, which causes deployer 138 to deploy the microservice to a node (e.g., node 106A, node 106B, node 106C, and/or node 106D) located in the region and/or zone indicated by indicator 145.

In accordance with an embodiment, deployment orchestrator 136 may be configured to determine which microservice(s) are to be deployed based on a plurality of declarative deployment models received via computing device(s) 102. For example, if a first declarative deployment model specifies that Microservice A is dependent on Microservice B, and a second declarative deployment model specifies that Microservice B conflicts with Microservice C, then deployment orchestrator 136 may determine the order of deployment to be Microservice B, followed by Microservice C and/or Microservice A, which is consistent with the specified microservice constraints, and cause deployer 138 to deploy Microservice B, Microservice C, and Microservice A accordingly. Deployer 138 may deploy the microservice(s) in accordance with the availability constraints specified by the declarative deployment model and/or determined by availability resolver 144.

Figure 2:
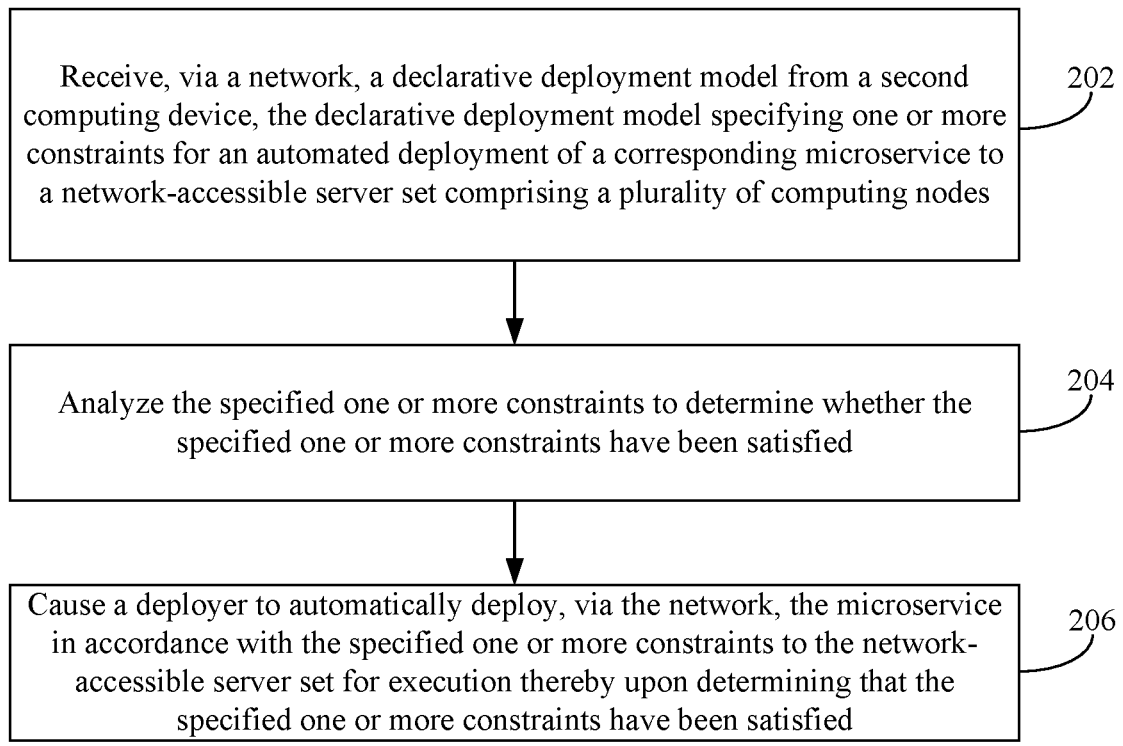
FIG. 2 depicts a flowchart of a method implemented by a deployment orchestrator executing on a computing device for automatically deploying microservice(s) to a network-accessible server set, according to an example embodiment.

Accordingly, in embodiments, microservices may be deployed to a network-accessible server set in many ways. For instance, FIG. 2 depicts a flowchart 200 of a method implemented by a deployment orchestrator executing on a first computing device for automatically deploying microservice(s) to a network-accessible server set, according to an example embodiment. In an embodiment, flowchart 200 may be implemented by deployment orchestrator 136, as shown in FIG. 1. FIG. 2 is described with continued reference to FIG. 1. Other structural and operational embodiments will be apparent to persons skilled in the relevant art(s) based on the following discussion regarding flowchart 200 and system 100 of FIG. 1.

Flowchart 200 begins with step 202. In step 202, a declarative deployment model is received via a network from a second computing device. The declarative deployment model specifies constraint(s) for an automated deployment of a corresponding microservice to a network-accessible server set comprising a plurality of computing nodes that are remotely located from the first computing device and the second computing device. For example, with reference to FIG. 1, deployment orchestrator 136 receives a declarative deployment model from computing device(s) 102 via network 110. The declarative deployment model specifies constraint(s) for an automated deployment of a corresponding microservice to a network-accessible server set comprising computing nodes 106A, 106B, 106C, and 106D, which are remotely located from computing device(s) 102 and computing device(s) 104.

In step 204, the specified constraint(s) are analyzed to determine whether the specified constraint(s) have been satisfied. For example, with reference to FIG. 1, version constraints resolver 140, deployment conflict resolver 142, and/or availability resolver 144 may analyze the specified constraint(s) and determine whether the specified constraint(s) have been specified.

In step 206, the deployment orchestrator causes a deployer to automatically deploy the microservice to the network-accessible server set for execution thereby via the network in accordance with the specified constraint(s) upon determining that the specified constraint(s) have been satisfied. For instance, with reference to FIG. 1, aggregator 146 orchestrator 136 may provide a deployment request 147 to deployer 138 upon determining that each of the constraint(s) analyzed by version constraints resolver 140, deployment conflict resolver 142, and/or availability resolver 144 have been satisfied, which causes deployer 138 to automatically deploy a microservice received from computing system(s) 102 to nodes 106A, 106B, 106C, and/or 106D in accordance with the constraints specified in the declarative deployment model.

In accordance with one or more embodiments, the constraint(s) specify at least one of whether deployment of the microservice is dependent on a deployment of a specified version of at least one of the microservice or one or more other microservices, whether deployment of the microservice conflicts with a deployment of one or more other microservices being deployed, an availability constraint in which the microservice is to be deployed to one or more specified regions, and/or further constraint(s).

In accordance with one or more embodiments, the specified one or more constraints are user-specified.

In accordance with one or more embodiments, a second declarative model is received via the network from the second computing device. The second declarative deployment model specifies one or more second constraints for an automated deployment of a corresponding second microservice to the network-accessible server set. The deployment orchestrator may analyze the specified constraint(s) of the first deployment model and the specified constraint(s) of the second deployment model and determine whether the specified first and second constraint(s) have been satisfied. The deployment orchestrator causes the deployer to automatically deploy the first microservice via the network to the network-accessible server set for execution thereby in accordance with the specified first and second constraint(s) upon determining that the specified first and second constraint(s) have been satisfied.

Figure 3:
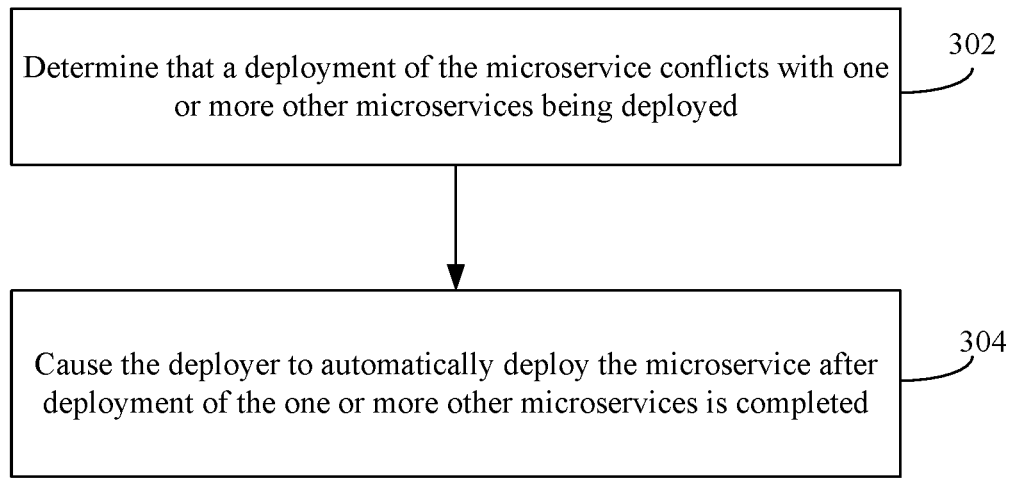
FIG. 3 depicts a flowchart of a method for automatically deploying a microservice based on whether the microservice conflicts with a deployment of other microservice(s), according to an example embodiment.
Figure 4:
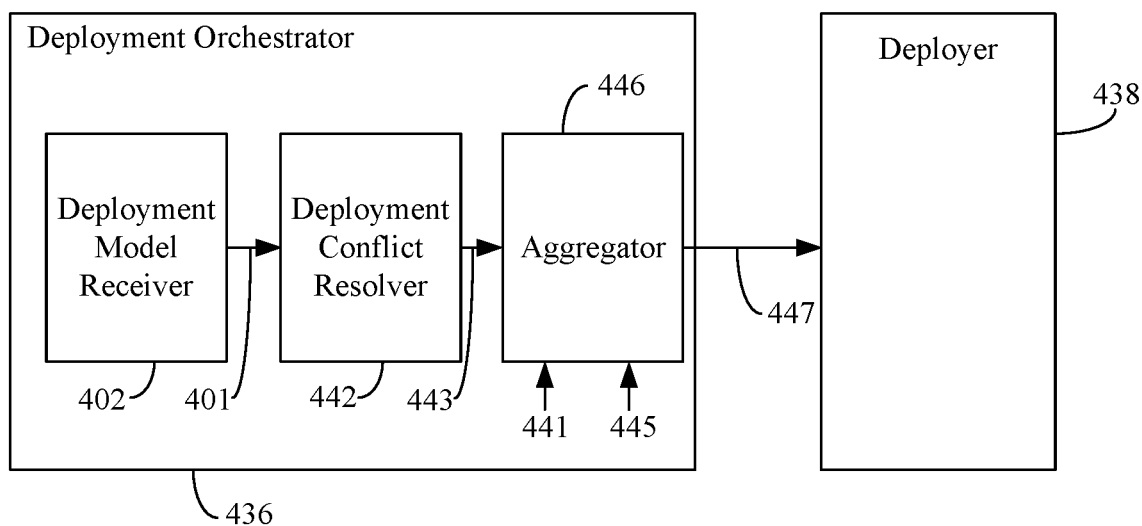
FIG. 4 is a block diagram of a deployment orchestrator, according to an example embodiment.

Steps 204 and 206 of FIG. 2 may be performed in accordance with various embodiments. For example, as described above, microservice(s) may be deployed, at least in part, in accordance with constraint(s) included in a declarative deployment model that specify whether the microservice(s) conflict with other microservice(s). FIG. 3 depicts a flowchart 300 of a method for automatically deploying a microservice based on whether the microservice conflicts with a deployment of other microservice(s), according to an example embodiment. In an embodiment, flowchart 300 may be implemented by a deployment orchestrator 436 shown in FIG. 4. FIG. 4 is a block diagram of deployment orchestrator 436 coupled to a deployer 438, according to an example embodiment. Deployment orchestrator 436 and deployer 438 are examples of deployment orchestrator 136 and deployer 138, as described above with reference to FIG. 1. As shown in FIG. 4, deployment orchestrator 436 includes a deployment model receiver 402, a deployment conflict resolver 442, and an aggregator 446. Deployment model receiver 402 is an example of deployment model receiver 137, as described above with reference to FIG. 1. Deployment model receiver 402 may be configured to receive declarative deployment model(s), as explained above with reference to step 202 of FIG. 2. Deployment conflict resolver 442 and aggregator 446 are examples of deployment conflict resolver 142 and aggregator 146, as described above with reference to FIG. 1. Other structural and operational embodiments will be apparent to persons skilled in the relevant art(s) based on the following discussion regarding flowchart 300 and deployment orchestrator 436.

Flowchart 300 begins with step 302. In step 302, a determination is made that a deployment of the microservice conflicts with one or more other microservices being deployed. For example, with reference to FIG. 4, deployment conflict resolver 442 analyzes a declarative deployment model 401 received from deployment model receiver 402 and determines that the deployment of the microservice conflicts with one or more other microservices being deployed.

At step 304, the deployment orchestrator causes the deployer to automatically deploy the microservice after deployment of the one or more other microservices is completed (i.e., deployment orchestrator causes the deployer to automatically deploy the microservice if no other conflicting microservice(s) are being deployed). For example, as shown in FIG. 4, deployment conflict resolver 442 may determine whether other conflicting microservice(s) are being deployed. Upon determining that the deployment of the other microservice(s) is complete, deployment conflict resolver 442 may provide an indicator 443 to aggregator 446. Aggregator 446 may provide a deployment request 447 that causes deployer 438 to automatically deploy the microservice. This advantageously ensures that only one microservice from conflicting microservices are deployed at any given time. As described above, aggregator 446 may send a deployment request 447 after receiving indicators from other constraint-based resolvers (e.g., version constraints resolver 140 and availability resolver 144, as described above with reference to FIG. 1) of deployment orchestrator 436. For example, as shown in FIG. 4, aggregator 446 may send deployment request 447 after receiving indicator 443, an indicator 441, and an indicator 445. Indicators 441 and 445 are examples of indicators 141 and 145, as described above with reference to FIG. 1. Thus, aggregator 446 sends deployment request 447 after each constraints-based resolver of deployment orchestrator 436 provides an indicator that its respective constraint(s) have been satisfied.

Figure 5:
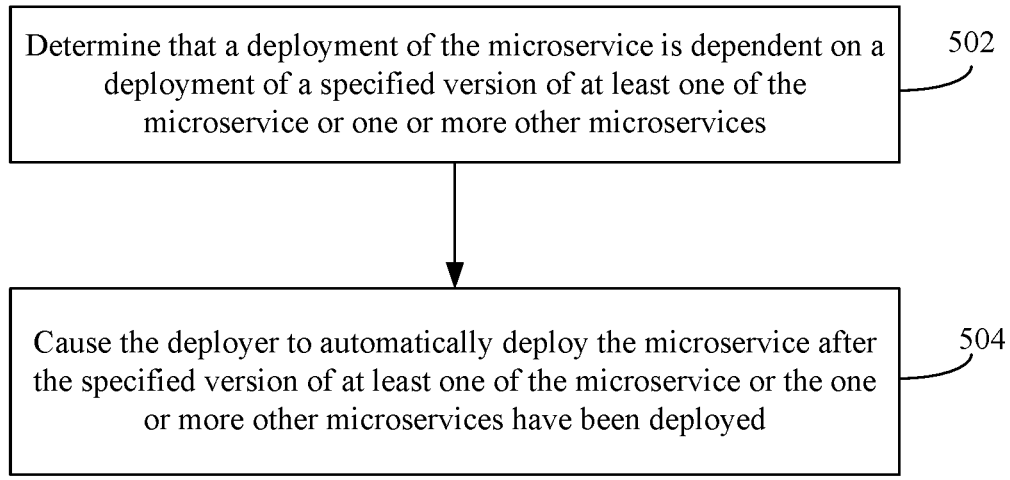
FIG. 5 depicts a flowchart of a method for automatically deploying a microservice based on whether the microservice is dependent on the deployment of specified version(s) of at least one of the microservice and/or other microservice(s), according to an example embodiment.
Figure 6:
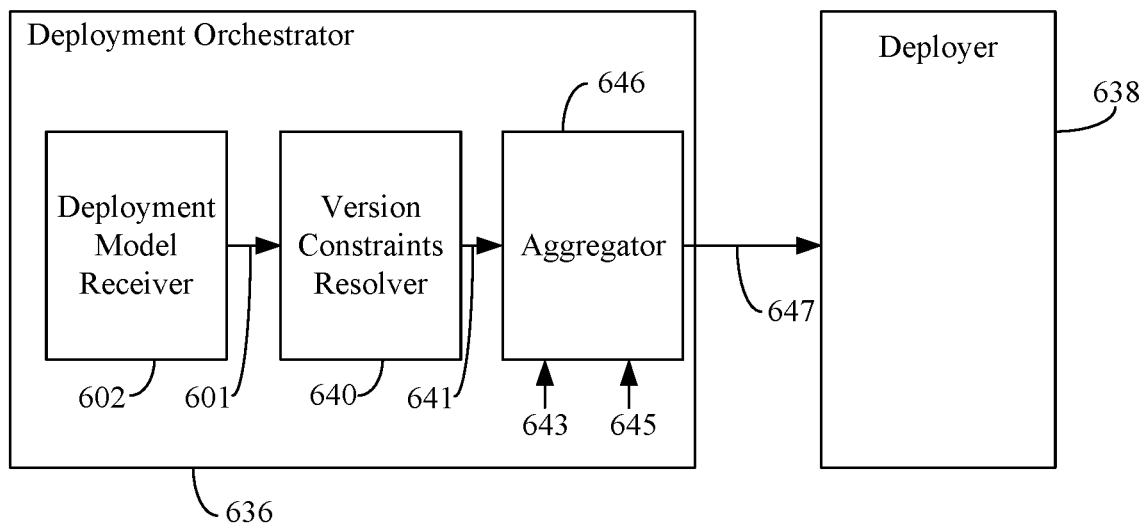
FIG. 6 is a block diagram of a deployment orchestrator, according to a further example embodiment.

As described above, microservice(s) may be deployed, at least in part, in accordance with constraint(s) included in a declarative deployment model that specify whether the microservice is dependent on the deployment of specified version(s) of at least one of the microservice and/or other microservice(s). FIG. 5 depicts a flowchart 500 of a method for automatically deploying a microservice based on whether the microservice is dependent on the deployment of specified version(s) of at least one of the microservice and/or other microservice(s), according to an example embodiment. In an embodiment, flowchart 600 may be implemented by a deployment orchestrator 636 shown in FIG. 6. FIG. 6 is a block diagram of deployment orchestrator 636 coupled to a deployer 638, according to an example embodiment. Deployment orchestrator 636 and deployer 638 are examples of deployment orchestrator 136 and deployer 138, as described above with reference to FIG. 1. As shown in FIG. 6, deployment orchestrator 636 includes a deployment model receiver 602, a version constraints resolver 640, and an aggregator 646. Deployment model receiver 602, version constraints resolver 640 and aggregator 646 are examples of deployment model receiver 137, version constraints resolver 140 and aggregator 146, as described above with reference to FIG. 1. Other structural and operational embodiments will be apparent to persons skilled in the relevant art(s) based on the following discussion regarding flowchart 500 and deployment orchestrator 636.

Flowchart 500 begins with step 502. In step 502, a determination is made that a deployment of the microservice is dependent on a deployment of a specified version of at least one of the microservice or other microservice(s). For example, with reference to FIG. 6, version constraints resolver 640 analyzes a declarative deployment model 601 received from deployment model receiver 602 and determines that the deployment of the microservice is dependent on the deployment of a specified version of at least one of the microservice or other microservice(s).

At step 504, the deployment orchestrator causes the deployer to automatically deploy the microservice after the specified version of at least one of the microservice or the other microservice(s) have been deployed. For example, as shown in FIG. 6, version constraints resolver 640 may determine whether the at least one of the microservice or the other microservice(s) have been deployed. Upon determining that at least one of the microservice or the other microservice(s) have been deployed, version constraints resolver 640 may provide an indicator 641 to aggregator 646. Aggregator 646 may provide a deployment request 647 that causes deployer 638 to automatically deploy the microservice. This advantageously ensures that the microservice is not deployed until the specified version of at least the microservice and/or the other microservice(s) have been deployed. As described above, aggregator 646 may send a deployment request 647 after receiving indicators from other constraint-based resolvers (e.g., deployment conflict resolver 142 and availability resolver 144, as described above with reference to FIG. 1) of deployment orchestrator 636. For example, as shown in FIG. 6, aggregator 646 may send deployment request 647 after receiving indicator 641, an indicator 643, and an indicator 645. Indicators 643 and 645 are examples of indicators 143 and 145, as described above with reference to FIG. 1. Thus, aggregator 646 may only send deployment request 647 after each constraints-based resolver of deployment orchestrator 636 provides an indicator that its respective constraint(s) have been satisfied.

Figure 7:
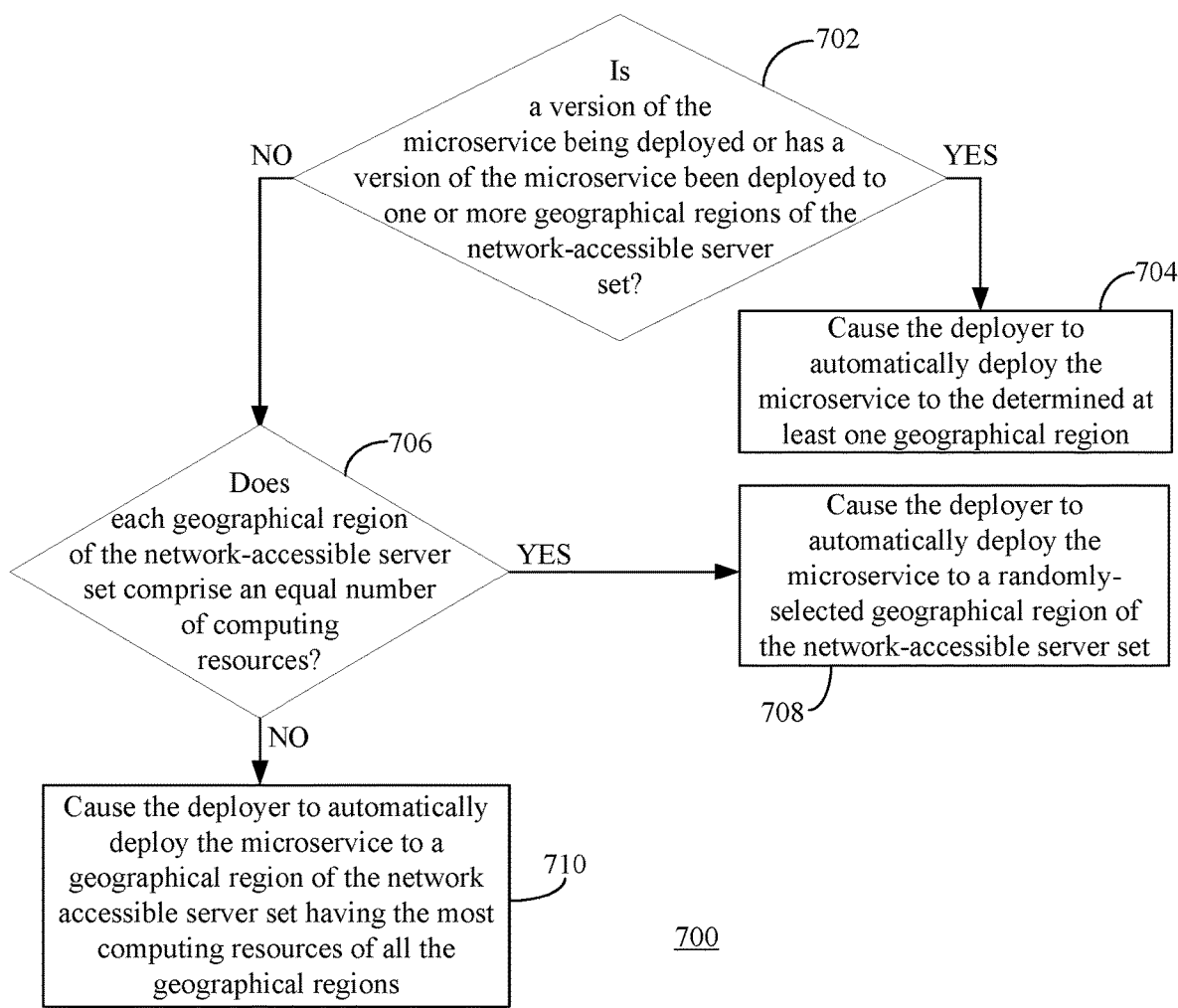
FIG. 7 depicts a flowchart of a method for automatically deploying a microservice to one or more geographical regions of the network-accessible server set, according to an example embodiment.
Figure 8:
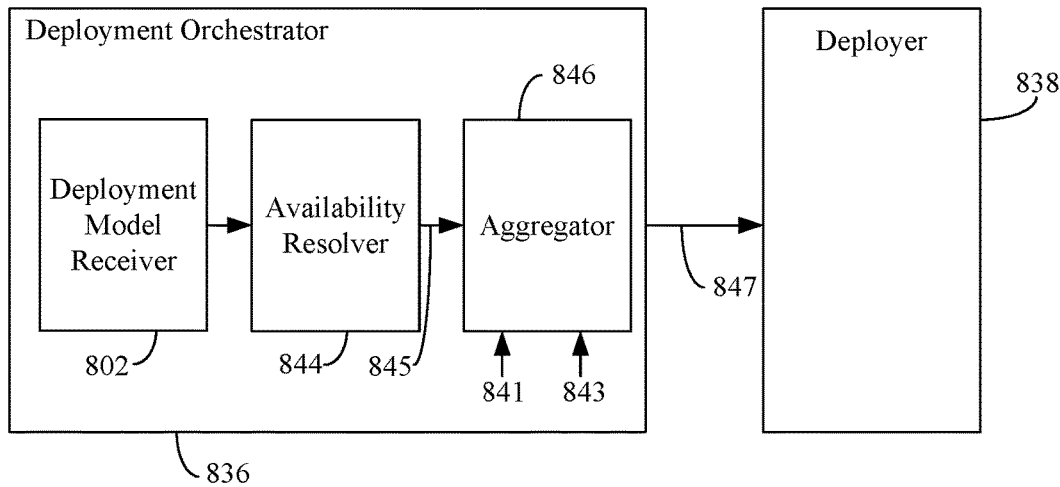
FIG. 8 is a block diagram of a deployment orchestrator, according to a further example embodiment.

As described above, in accordance with one or more embodiments, microservice(s) may be automatically deployed to one or more geographical regions of the network-accessible server set located. FIG. 7 depicts a flowchart 700 of a method for automatically deploying a microservice to one or more geographical regions of the network-accessible server set, according to an example embodiment. In an embodiment, flowchart 700 may be implemented by a deployment orchestrator 836 shown in FIG. 8. FIG. 8 is a block diagram of deployment orchestrator 836 coupled to a deployer 838, according to an example embodiment. Deployment orchestrator 836 and deployer 838 are examples of deployment orchestrator 136 and deployer 138, as described above with reference to FIG. 1. As shown in FIG. 8, deployment orchestrator 836 includes a deployment receiver 802, an availability resolver 844 and an aggregator 846. Deployment model receiver 802, availability resolver 844 and aggregator 846 are examples of deployment model receiver 137, availability resolver 144 and aggregator 146, as described above with reference to FIG. 1. Other structural and operational embodiments will be apparent to persons skilled in the relevant art(s) based on the following discussion regarding flowchart 700 and deployment orchestrator 836.

Flowchart 700 begins with step 702. In step 702, a determination is made as to whether a version of the microservice is being deployed or has been deployed to one or more geographical regions of the network-accessible server set. For example, with reference to FIG. 8, availability resolver 844 may determine whether a version of the microservice is being deployed or has been deployed to one or more geographical regions of the network-accessible server set. In response to determining that a version of the microservice is being deployed or has been deployed to one or more geographical regions of the network-accessible server set, flow continues to step 704. Otherwise, flow continues to step 706.

At step 704, the deployer is caused to automatically deploy the microservice to the determined at least one geographical region. For example, with reference to FIG. 8, availability resolver 844 may provide an indicator 845 to aggregator 846 that indicates the determined at least one geographical region. Aggregator 846 may provide a deployment request 847 that causes deployer 838 to automatically deploy the microservice to the determined at least one geographical region.

At step 706, a determination is made as to whether each geographical region of the network-accessible server set comprises an equal number of computing resources. For example, with reference to FIG. 8, availability resolver 844 may determine whether each geographical region of the network-accessible server set comprises an equal number of computing resources. In response to determining that each geographical region of the network-accessible server set comprises an equal number of computing resources, flow continues to step 708. Otherwise, flow continues to step 710.

At step 708, the deployer is caused to automatically deploy the microservice to a randomly-selected geographical region of the network-accessible server. For example, with reference to FIG. 8, availability resolver 844 may provide an indicator 845 to aggregator 846 that indicates the randomly-selected geographical region. Aggregator 846 may provide a deployment request 847 that causes deployer 838 to automatically deploy the microservice to the randomly-selected geographical region.

At step 710, the deployer is caused to automatically deploy the microservice to a geographical region of the network-accessible server having the most computing resources of all the geographical regions. For example, with reference to FIG. 8, availability resolver 844 may provide an indicator 845 to aggregator 846 that indicates the geographical region having the most computing resources. Aggregator 846 may provide a deployment request 847 that causes deployer 838 to automatically deploy the microservice to the geographical region having the most computing resources.

In accordance with one or more embodiments, the geographical region(s) are a region of a region pair.

In accordance with one or more embodiments the geographical region(s) are an availability zone within a particular region of a region pair.

As described above, aggregator 846 may send a deployment request 847 after receiving indicators from other constraint-based resolvers (e.g., deployment conflict resolver 142 and version constraints resolver 140, as described above with reference to FIG. 1) of deployment orchestrator 836. For example, as shown in FIG. 8, aggregator 846 may send deployment request 847 after receiving indicator 845, an indicator 841, and an indicator 845. Indicators 841 and 845 are examples of indicators 141 and 145, as described above with reference to FIG. 1. Thus, aggregator 846 may only send deployment request 847 after each constraints-based resolver of deployment orchestrator 836 provides an indicator that its respective constraint(s) have been satisfied.

Note that deployment orchestrator embodiments may include any one or more of deployment conflict resolver 442, version constraints resolver 640, and/or availability resolver 844, and/or other components for handling other constraints mentioned elsewhere herein or otherwise known.

III. Example Computer System Implementation

Computing device(s) 102, computing devices 104, nodes 106A-106D, microservice development system 122, source code editor 124, package builder 126, deployment policy generator 129, deployment model generator 130, deployment orchestrator 136, deployment model receiver 137, version constraints resolver 140, deployment conflict resolver 142, availability resolver 144, aggregator 146, deployer 138, deployment orchestrator 436, deployment model receiver 402, deployment conflict resolver 442, aggregator 446, deployer 438, deployment orchestrator 636, deployment model receiver 602, version constraints resolver 640, aggregator 646, deployer 638, deployment model receiver 802, deployment orchestrator 836, availability resolver 844, aggregator 846, deployer 838, flowchart 200, flowchart 300, flowchart 500, and/or flowchart 700 may be implemented in hardware, or hardware with any combination of software and/or firmware, including being implemented as computer program code configured to be executed in one or more processors and stored in a computer readable storage medium, or being implemented as hardware logic/ electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
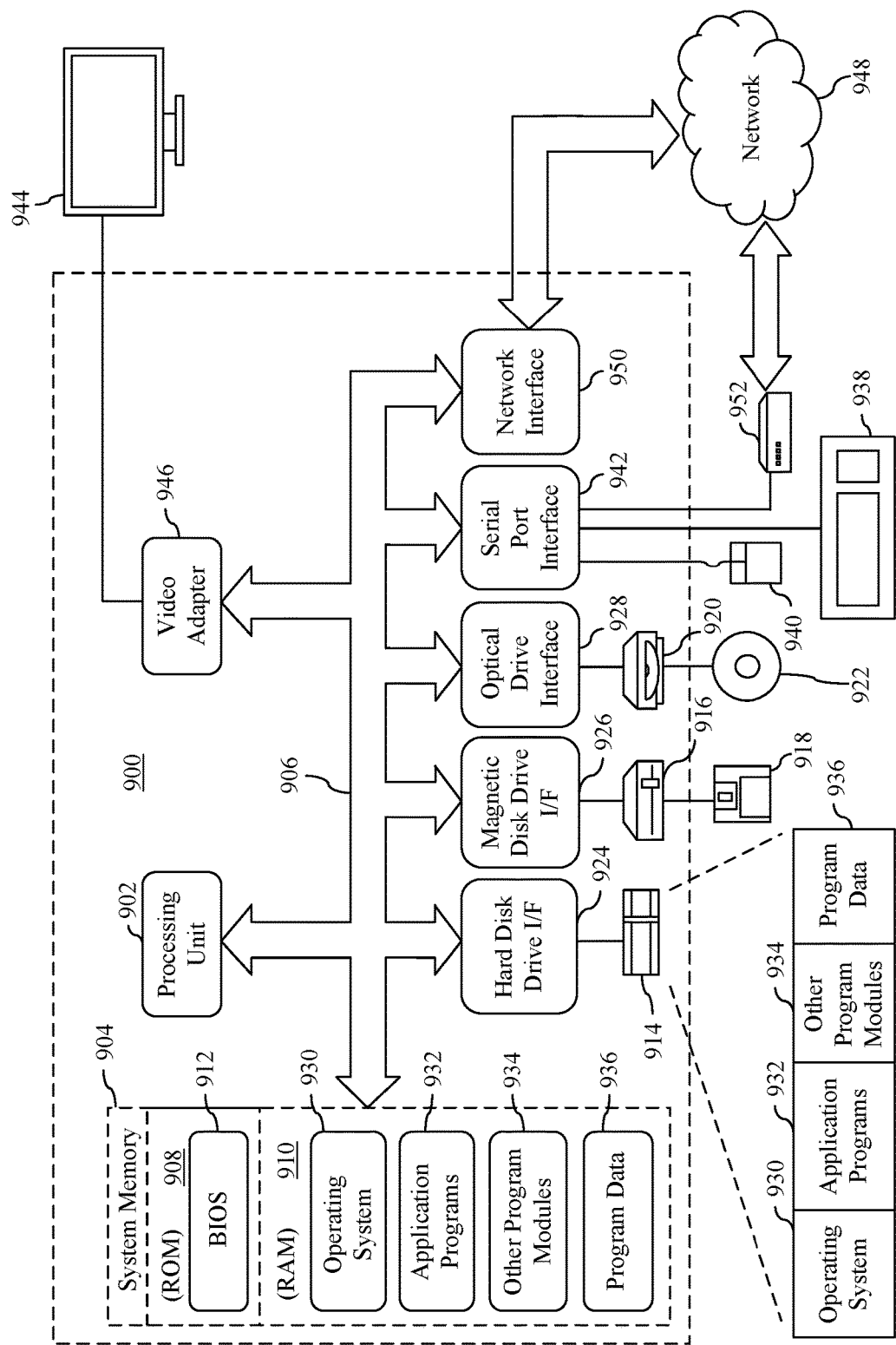
FIG. 9 is a block diagram of an example processor-based computer system that may be used to implement various embodiments.

FIG. 9 depicts an example processor-based computer system 900 that may be used to implement various embodiments described herein. For example, system 900 may be used to implement computing device(s) 102, computing device(s) 104, or nodes 106A, 106B, 106C, and/or 106D, as described above in reference to FIG. 1. System 900 may also be used to implement any of the steps of any of the flowcharts of FIGS. 2, 3, 5 and 7, as described above. The description of system 900 provided herein is provided for purposes of illustration, and is not intended to be limiting. Embodiments may be implemented in further types of computer systems, as would be known to persons skilled in the relevant art(s).

As shown in FIG. 9, system 900 includes a processing unit 902, a system memory 904, and a bus 906 that couples various system components including system memory 904 to processing unit 902. Processing unit 902 may comprise one or more circuits, microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to perform any or all of the functions and features of computing device(s) 102, computing device(s) 104, or nodes 106A, 106B, 106C, and/or 106D, as described above in reference to FIG. 1. The program modules may also include computer program logic that, when executed by processing unit 902, causes processing unit 902 to perform any of the steps of any of the flowcharts of FIGS. 2, 3, 5 and 7, as described above.

A user may enter commands and information into system 900 through input devices such as a keyboard 938 and a pointing device 940 (e.g., a mouse). Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

Display 944 is connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface 950, a modem 952, or other suitable means for establishing communications over the network. Modem 952, which may be internal or external, is connected to bus 906 via serial port interface 942.

As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable system 1700 to implement features of embodiments discussed herein. Accordingly, such computer programs represent controllers of the system 900. Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks,

IV. Additional Example Embodiments

In one embodiment, a method implemented by a deployment orchestration service executing on a first computing device comprises: receiving, via a network, a first declarative deployment model and a second declarative deployment model from a second computing device, the first declarative deployment model specifying one or more first constraints for an automated deployment of a corresponding first microservice to a network-accessible server set comprising a plurality of computing nodes that are remotely located from the first computing device and the second computing device, the second declarative deployment model specifying one or more second constraints for an automated deployment of a corresponding second microservice to the network-accessible server set; analyzing the specified one or more first constraints and the specified one or more second constraints to determine whether the specified one or more first constraints and the specified one or more second constraints have been satisfied; and causing a deployer to automatically deploy, via the network, the first microservice in accordance with the specified one or more first constraints and the specified one or more second constraints to the network-accessible server set for execution thereby upon determining that the specified one or more first constraints and the specified one or more second constraints have been satisfied.

In an embodiment, the one or more constraints specify at least one of: whether deployment of the microservice is dependent on a deployment of a specified version of at least one of the microservice or one or more other microservices; whether deployment of the microservice conflicts with one or more other microservices being deployed; or an availability constraint in which the microservice is to be deployed to one or more specified regions.

In an embodiment, the analyzing comprises: determining that a deployment of the microservice conflicts with one or more other microservices being deployed; and the causing comprising causing the deployer to automatically deploy the microservice after deployment of the one or more other microservices is completed.

In an embodiment, the analyzing comprises: determining that a deployment of the microservice is dependent on a deployment of a specified version of at least one of the microservice or one or more other microservices; and the causing comprising causing the deployer to automatically deploy the microservice after the specified version of at least one of the microservice or the one or more other microservices have been deployed.

In an embodiment, the specified one or more constraints are user-specified.

In an embodiment, the causing comprises: causing the deployer to automatically deploy the microservice to a particular geographical region of the network-accessible server set.

In an embodiment, the causing the deployer to automatically deploy the microservice to a particular geographical region of the network-accessible server set comprises: determining whether a version of the microservice is being deployed or has been deployed to one or more geographical regions of the network-accessible server set; in response to determining that a version of the microservice is being deployed or has been deployed to at least one geographical region of the network-accessible server set, causing the deployer to automatically deploy the microservice to the determined at least one geographical region; and in response to determining that a version of the microservice is not being deployed or has not been deployed to any geographical region of the network-accessible server set, determining whether each geographical region of the network-accessible server set comprises an equal number of computing resources; in response to determining that each geographical region comprises an equal number of computing resources, causing the deployer to deploy the microservice to a randomly-selected geographical region of the network-accessible server set; and in response to determining that each geographical region does not comprise an equal number of computing resources, causing the deployer to deploy the microservice to a geographical region of the network accessible server set having the most computing resources of all the geographical regions.

In an embodiment, the one or more first constraints and the one or more second constraints are specified in a non-imperative manner.

In one embodiment, a computing device comprises: at least one processing circuit; and at least one memory that stores program code configured to be executed by the at least one processor circuit, the program code comprising: a deployment orchestrator configured to automatically deploy microservices to a network-accessible server set, the deployment orchestrator comprising: a deployment model receiver configured to receive, via a network, a declarative deployment model from a second computing device, the declarative deployment model specifying one or more constraints for an automated deployment of a corresponding microservice to a network-accessible server set comprising a plurality of computing nodes that are remotely located from the first computing device and the second computing device; and at least one constraints-based resolver configured to analyze the specified one or more constraints to determine whether the specified one or more constraints have been satisfied, the deployment orchestrator configured to provide a request to a deployer to automatically deploy, via the network, the microservice to the network-accessible server set for execution thereby, the request being provided upon determining that the specified one or more constraints have been satisfied.

In an embodiment, the one or more constraints specify at least one of: whether deployment of the microservice is dependent on a deployment of a specified version of at least one of the microservice or one or more other microservices; whether deployment of the microservice conflicts with one or more other microservices being deployed; or an availability constraint in which the microservice is to be deployed to one or more specified regions.

In an embodiment, the deployment orchestrator comprises a deployment conflict resolver configured to: determine that a deployment of the microservice conflicts with one or more other microservices being deployed; and cause the deployer to automatically deploy the microservice after deployment of the one or more other microservices is completed.

In an embodiment, wherein the deployment orchestrator comprises a version constrains resolver configured to: determine that a deployment of the microservice is dependent on a deployment of a specified version of at least one of the microservice or one or more other microservices; and cause the deployer to automatically deploy the microservice after the specified version of at least one of the microservice or the one or more other microservices have been deployed.

In an embodiment, the specified one or more constraints are user-specified.

In an embodiment, the deployment orchestrator comprises an availability resolver configured to: cause the deployer to automatically deploy the microservice to a particular geographical region of the network-accessible server set.

In an embodiment, the availability resolver is configured to cause the deployer to automatically deploy the microservice to the particular geographical region of the network-accessible server set by: determining whether a version of the microservice is being deployed or has been deployed to one or more geographical regions of the network-accessible server set; in response to determining that a version of the microservice is being deployed or has been deployed to at least one geographical region of the network-accessible server set, causing the deployer to automatically deploy the microservice to the determined at least one geographical region; and in response to determining that a version of the microservice is not being deployed or has not been deployed to any geographical region of the network-accessible server set, determining whether each geographical region of the network-accessible server set comprises an equal number of computing resources; in response to determining that each geographical region comprises an equal number of computing resources, causing the deployer to deploy the microservice to a randomly-selected geographical region of the network-accessible server set; and in response to determining that each geographical region does not comprise an equal number of computing resources, causing the deployer to deploy the microservice to a geographical region of the network accessible server set having the most computing resources of all the geographical regions.

In an embodiment, the deployment model receiver is further configured to: receive, via the network, a second declarative deployment model from the second computing device, the second declarative deployment model specifying one or more second constraints for an automated deployment of a corresponding second microservice to the network-accessible server set; wherein the at least one constraints-based resolver is further configured to analyze the specified one or more first constraints of the first declarative model and the specified one or more second constraints of the second declarative model to determine whether the specified one or more first constraints and the one or more second constraints have been satisfied; and wherein the deployment orchestrator is further configured to provide a second request to the deployer to automatically deploy, via the network, the first microservice to the network-accessible server set for execution thereby, the second request being provided upon determining that the specified one or more first constraints and the specified one or more second constraints have been satisfied.

In an embodiment, a computer-readable storage medium having program instructions recorded thereon that, when executed by at least one processing circuit, perform a method on a first computing device for automatically deploying microservices to a network-accessible server set. The method comprises: receiving, via a network, a declarative deployment model from a second computing device, the declarative deployment model specifying one or more constraints for an automated deployment of a corresponding microservice to the network-accessible server set comprising a plurality of computing nodes that are remotely located from the first computing device and the second computing device; analyzing the specified one or more constraints to determine whether the specified one or more constraints have been satisfied; and causing a deployer to automatically deploy, via the network, the microservice in accordance with the specified one or more constraints to the network-accessible server set for execution thereby upon determining that the specified one or more constraints have been satisfied.

In an embodiment, the one or more constraints specify at least one of: whether deployment of the microservice is dependent on a deployment of a specified version of at least one of the microservice or one or more other microservices; whether deployment of the microservice conflicts with one or more other microservices being deployed; an availability constraint in which the microservice is to be deployed to one or more specified regions.

In an embodiment, the analyzing comprises: determining that a deployment of the microservice conflicts with one or more other microservices being deployed; and the causing comprises: and causing the deployer to automatically deploy the microservice after deployment of the one or more other microservices is completed.

In an embodiment, the causing comprises: determining that a deployment of the microservice is dependent on a deployment of a specified version of at least one of the microservice or one or more other microservices; and causing the deployer to automatically deploy the microservice after the specified version of at least one of the microservice or the one or more other microservices have been deployed.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method implemented by a deployment orchestrator executing on a first computing device, comprising:
receiving, via a network, a first declarative microservice deployment model and a second microservice declarative deployment model from a second computing device, the first microservice declarative deployment model specifying one or more first constraints for an automated deployment of a corresponding first microservice to a network-accessible server set comprising a plurality of computing nodes that are remotely located from the first computing device and the second computing device, the second declarative microservice deployment model specifying one or more second constraints for an automated deployment of a corresponding second microservice to the network-accessible server set, the one or more first constraints specifying at least one of whether deployment of the first microservice is dependent on a deployment of a specified version of at least one of the first microservice or one or more other first microservices or a first availability constraint in which the first microservice is to be deployed to one or more first specified regions, and the one or more second constraints specifying at least one of whether deployment of the second microservice is dependent on a deployment of a specified version of at least one of the second microservice or one or more other second microservices or a second availability constraint in which the second microservice is to be deployed to one or more second specified regions;

prior to deployment and execution of the first microservice and the second microservice, analyzing the specified one or more first constraints and the specified one or more second constraints to determine an order in which the first microservice and the second microservice are to be deployed; and causing a deployer to automatically deploy, via the network, the first microservice and the second microservice in accordance with the determined order, the first microservice and the second microservice being deployed to the network-accessible server set for execution thereby.

2. The method of claim 1, wherein the one or more first constraints further specify whether deployment of the first microservice conflicts with one or more other microservices being deployed.

3. The method of claim 1, wherein said analyzing comprises:

determining that a deployment of the first microservice conflicts with one or more other microservices being deployed; and wherein said causing comprises:

causing the deployer to automatically deploy the first microservice after deployment of the one or more other microservices is completed.

4. The method of claim 1, wherein said analyzing comprises:

determining that a deployment of the first microservice is dependent on a deployment of the specified version of the at least one of the first microservice or the one or more other microservices; and wherein said causing comprises:

causing the deployer to automatically deploy the first microservice after the specified version of at least one of the first microservice or the one or more other microservices have been deployed.

5. The method of claim 1, wherein the specified one or more first constraints are user-specified.

6. The method of claim 1, wherein said causing comprises:

causing the deployer to automatically deploy the first microservice to a particular geographical region of the network-accessible server set.

7. The method of claim 6, said causing the deployer to automatically deploy the first microservice to a particular geographical region of the network-accessible server set comprising:

determining whether a version of the first microservice is being deployed or has been deployed to one or more geographical regions of the network-accessible server set;

in response to determining that a version of the first microservice is being deployed or has been deployed to at least one geographical region of the network-accessible server set, causing the deployer to automatically deploy the first microservice to the determined at least one geographical region; and in response to determining that a version of the first microservice is not being deployed or has not been deployed to any geographical region of the network-accessible server set, determining whether each geographical region of the network-accessible server set comprises an equal number of computing resources;

in response to determining that each geographical region comprises an equal number of computing resources, causing the deployer to deploy the first microservice to a randomly-selected geographical region of the network-accessible server set; and in response to determining that each geographical region does not comprise an equal number of computing resources, causing the deployer to deploy the first microservice to a geographical region of the network accessible server set having the most computing resources of all the geographical regions.

8. The method of claim 1, wherein the one or more first constraints and the one or more second constraints are specified in a non-imperative manner.

9. A first computing device, comprising:

at least one processor circuit; and at least one memory that stores program code configured to be executed by the at least one processor circuit, the program code comprising:

a deployment orchestrator configured to automatically deploy microservices to a network-accessible server set, the deployment orchestrator comprising:

a deployment model receiver configured to receive, via a network, a declarative microservice deployment models from at least a second computing device, the declarative microservice deployment models specifying one or more respective constraints for an automated deployment of corresponding microservices to a network-accessible server set comprising a plurality of computing nodes that are remotely located from the first computing device and the at least second computing device, one or more constraints of the respective constraints for a particular microservice of the microservices specifying at least one of whether deployment of the particular microservice is dependent on a deployment of a specified version of at least one of the particular microservice or one or more other microservices or a first availability constraint in which the particular microservice is to be deployed to one or more specified regions; and at least one constraints-based resolver configured to, prior to deployment and execution of the microservices corresponding to the declarative microservice deployment models, analyze the one or more constraints specified by the declarative microservice deployment models to determine an order in which the microservices are to be deployed, the deployment orchestrator configured to provide a request to a deployer to automatically deploy, via the network, the microservices in accordance with the determined order, the microservices being deployed to the network-accessible server set for execution thereby.

10. The first computing device of claim 9, wherein the one or more constraints for the particular microservice of the microservices further specify:

whether deployment of the particular microservice conflicts with one or more other microservices being deployed.

11. The first computing device of claim 9, wherein the deployment orchestrator comprises a deployment conflict resolver configured to:

determine that a deployment of a particular microservice of the microservices conflicts with one or more other microservices being deployed; and cause the deployer to automatically deploy the particular microservice after deployment of the one or more other microservices is completed.

12. The first computing device of claim 9, wherein the deployment orchestrator comprises a version constraints resolver configured to:
- determine that a deployment of the particular microservice of the microservices is dependent on a deployment of the specified version of the at least one of the particular microservice or the one or more other microservices; and
- cause the deployer to automatically deploy the particular microservice after the specified version of at least one of the particular microservice or the one or more other microservices have been deployed.

13. The first computing device of claim 9, wherein the specified one or more respective constraints are user-specified.

14. The first computing device of claim 9, wherein the deployment orchestrator comprises an availability resolver configured to:
- cause the deployer to automatically deploy particular microservice of the microservices to a particular geographical region of the network-accessible server set.

15. The first computing device of claim 14, wherein the availability resolver is configured to cause the deployer to automatically deploy the particular microservice to the particular geographical region of the network-accessible server set by:
- determining whether a version of the particular microservice is being deployed or has been deployed to one or more geographical regions of the network-accessible server set;
- in response to determining that a version of the particular microservice is being deployed or has been deployed to at least one geographical region of the network-accessible server set, causing the deployer to automatically deploy the particular microservice to the determined at least one geographical region; and
- in response to determining that a version of the particular microservice is not being deployed or has not been deployed to any geographical region of the network-accessible server set, determining whether each geographical region of the network-accessible server set comprises an equal number of computing resources;
  - in response to determining that each geographical region comprises an equal number of computing resources, causing the deployer to deploy the particular microservice to a randomly-selected geographical region of the network-accessible server set; and
  - in response to determining that each geographical region does not comprise an equal number of computing resources, causing the deployer to deploy the particular microservice to a geographical region of the network accessible server set having the most computing resources of all the geographical regions.

16. A computer-readable storage medium having program instructions recorded thereon that, when executed by at least one processing circuit, perform a method on a first computing device for automatically deploying microservices to a network-accessible server set, the method comprising:
- receiving, via a network, a declarative microservice deployment models from at least a second computing device, the declarative microservice deployment models specifying one or more respective constraints for an automated deployment of corresponding microservices to the network-accessible server set comprising a plurality of computing nodes that are remotely located from the first computing device and the at least second computing device, one or more constraints of the respective constraints for a particular microservice of the microservices specifying at least one of whether deployment of the particular microservice is dependent on a deployment of a specified version of at least one of the particular microservice or one or more other microservices or a first availability constraint in which the particular microservice is to be deployed to one or more specified regions;
- prior to deployment and execution of the microservices corresponding to the declarative microservice deployment models, analyzing the one or more constraints specified by the declarative microservice deployment models to determine an order in which the microservices are to be deployed; and
- causing a deployer to automatically deploy, via the network, the microservices in accordance with the determined order, the microservices being deployed to the network-accessible server set for execution thereby.

17. The computer-readable storage medium of claim 16, wherein the one or more constraints for the particular microservice of the microservices further specify
- whether deployment of the particular microservice conflicts with one or more other microservices being deployed.

18. The computer-readable storage medium of claim 16, wherein said analyzing comprises:
- determining that a deployment of a particular microservice of the microservices conflicts with one or more other microservices being deployed; and wherein said causing comprises:
- causing the deployer to automatically deploy the particular microservice after deployment of the one or more other microservices is completed.

19. The computer-readable storage medium of claim 16, wherein said analyzing comprises:
- determining that a deployment of the particular microservice of the microservices is dependent on a deployment of the specified version of the at least one of the particular microservice or the one or more other microservices; and wherein said causing comprises:
- causing the deployer to automatically deploy the particular microservice after the specified version of at least one of the particular microservice or the one or more other microservices have been deployed.

20. The computer-readable storage medium of claim 16, wherein the specified one or more respective constraints are user-specified.

* * * * *